(12) United States Patent
 Smith

(10) Patent No.: US 11,999,401 B2
(45) Date of Patent: Jun. 4, 2024

(54) MOTORIZED WEIGHT-BEARING DEVICE

(71) Applicant: Triangle Strong Partners, LLC, Salt Lake City, UT (US)

(72) Inventor: Brady Smith, Morgan, UT (US)

(73) Assignee: Triangle Strong Partners, LLC, Salt Lake City, UT (US)

( * ) Notice: Subject to any disclaimer, the term of this patent is extended or adjusted under 35 U.S.C. 154(b) by 632 days.

(21) Appl. No.: 16/516,819

(22) Filed: Jul. 19, 2019

(65) Prior Publication Data

US 2020/0023878 A1    Jan. 23, 2020

Related U.S. Application Data

(60) Provisional application No. 62/701,257, filed on Jul. 20, 2018.

(51) Int. Cl.
 *B62B 5/00* (2006.01)
 *B60S 1/68* (2006.01)
 *B62B 1/12* (2006.01)
 *B62B 5/04* (2006.01)
 (Continued)

(52) U.S. Cl.
 CPC .............. *B62B 5/0043* (2013.01); *B60S 1/68* (2013.01); *B62B 1/12* (2013.01); *B62B 5/0066* (2013.01); *B62B 5/0069* (2013.01); *B62B 5/04* (2013.01); *B62B 5/0438* (2013.01); *B62B 5/06* (2013.01);
 (Continued)

(58) Field of Classification Search
 CPC ... B62B 5/0026; B62B 5/0036; B62B 5/0033; B62B 5/0043; B62B 5/0046; B62B 5/005; B62B 5/003; B62B 5/004; B62B 2202/42; B62B 1/10; B62B 1/12; B62B 1/18; B62B 1/125; B60S 1/68; B62D 51/065
 See application file for complete search history.

(56) References Cited

U.S. PATENT DOCUMENTS

| 303,476 | A | * | 8/1884 | Whipp | ...................... B60S 1/68 280/855 |
| 737,509 | A | * | 8/1903 | Smith | ........................ B62J 6/20 280/158.1 |

(Continued)

FOREIGN PATENT DOCUMENTS

| CN | 101817356 | 9/2010 |
| CN | 102806933 | 12/2012 |

(Continued)

OTHER PUBLICATIONS

"14inch Elecetric Wheelbarrow Kit Single Wheel High Torque Gear Wheelbarrow Hub Motor Kit 24v 36v for Farm Forest Soil Land Grass", Green E-motion Store; accessed from https://www.aliexpress.com/item/14inch-Elecetric-Wheelbarrow-kit-Single-Wheel-Electric-Wheelbarrow-Hub-Motor-Kit-24v-36v-For-Farm-Forest/32797535970.html, Accessed on Jun. 21, 2018, 9 pages.

(Continued)

*Primary Examiner* — Emma K Frick
(74) *Attorney, Agent, or Firm* — RAY QUINNEY & NEBEKER P.C.; Paul N. Taylor

(57) ABSTRACT

A weight-bearing device includes a single wheel, a frame attached to the wheel, and an electric motor attached to the frame. The electric motor is configured to rotate a first gear, connected to a second gear with a chain. The second gear is connected to the wheel. The second gear and the first gear may have a gear ratio of greater than 8:1.

21 Claims, 12 Drawing Sheets

(51) Int. Cl.
  *B62B 5/06* (2006.01)
  *B62D 51/06* (2006.01)
(52) U.S. Cl.
  CPC .... *B62D 51/065* (2013.01); *B62B 2005/0471* (2013.01); *B62B 2202/42* (2013.01)

(56) References Cited

U.S. PATENT DOCUMENTS

| | | | | |
|---|---|---|---|---|
| 1,648,374 A * | 11/1927 | Walker | ............... | B62B 1/18 280/47.31 |
| 2,656,894 A * | 10/1953 | Giovannoni | ......... | B62D 51/005 180/19.1 |
| 2,856,017 A | 10/1958 | Overstreet | | |
| 2,918,299 A * | 12/1959 | Lambert | ............... | B62B 5/0026 280/47.23 |
| 2,979,338 A * | 4/1961 | Dwyer | ............... | B62B 1/20 280/47.3 |
| 3,055,449 A * | 9/1962 | Murphy | ............... | B62D 51/005 280/47.3 |
| 3,212,595 A * | 10/1965 | Mathews | ............. | B62D 51/065 280/492 |
| 3,236,537 A * | 2/1966 | Eckman | ............... | A61G 1/0225 280/47.3 |
| 3,246,909 A * | 4/1966 | Siwek | ................. | A01D 34/824 74/532 |
| 3,456,959 A * | 7/1969 | Hemphill | ............ | B62B 5/0438 280/47.3 |
| 3,692,135 A * | 9/1972 | Holzmann | ........... | B62D 51/06 180/19.1 |
| 4,063,744 A * | 12/1977 | Fraser | ............... | B62B 1/208 280/42 |
| 4,154,327 A * | 5/1979 | Haeussinger | ......... | F16D 41/30 192/64 |
| 4,168,080 A * | 9/1979 | Poe | ................... | B62J 50/15 280/158.1 |
| D363,585 S * | 10/1995 | Crossman | ................ | D34/12 |
| 5,620,193 A * | 4/1997 | Dschaak | ................. | B62B 1/22 280/47.31 |
| 5,799,960 A * | 9/1998 | Davis, Sr. | ................. | B62B 5/06 298/3 |
| 5,884,920 A * | 3/1999 | Seto | ............... | B62B 9/20 280/30 |
| 6,116,350 A * | 9/2000 | Notaras | ................... | A01D 34/84 172/15 |
| 6,129,166 A * | 10/2000 | Sueshige | ............... | B62B 5/0026 180/65.6 |
| 6,260,864 B1 * | 7/2001 | Smith | ............... | B62B 1/04 280/63 |
| 6,361,063 B1 * | 3/2002 | Daeschner | ............... | B62B 5/0438 280/47.3 |
| 6,470,981 B1 | 10/2002 | Sueshige et al. | | |
| 6,736,417 B1 * | 5/2004 | Whitmire | ............ | A61G 5/1037 280/47.3 |
| 6,793,236 B1 * | 9/2004 | Mitchell | ................ | B62B 5/005 280/47.24 |
| 6,926,292 B1 * | 8/2005 | Weeks | ...................... | B62B 1/26 280/30 |
| 7,172,207 B2 * | 2/2007 | Henry | ...................... | B60D 1/00 280/651 |
| 7,658,390 B2 * | 2/2010 | Martin | ...................... | B62B 5/06 16/422 |
| 7,793,744 B1 * | 9/2010 | Hardie | ................... | B62D 51/06 180/19.1 |
| 7,803,098 B2 * | 9/2010 | Cofrin | ................ | A63B 21/4017 482/148 |
| 8,235,153 B2 * | 8/2012 | Robinson | ................ | B60L 50/66 180/19.3 |
| 8,613,455 B2 * | 12/2013 | Berrett | ................. | A61G 1/0225 180/21 |
| 9,302,688 B2 * | 4/2016 | Reddi | ....................... | B62B 1/08 |
| 9,415,789 B2 * | 8/2016 | Sommers | ................... | B62B 1/042 |
| 9,986,731 B2 * | 6/2018 | Mitchell | ................. | B62B 3/002 |
| 10,569,818 B2 * | 2/2020 | Rogers | ..................... | B62J 25/06 |
| 10,654,503 B1 * | 5/2020 | Carlson | .................. | B62B 1/12 |
| 11,180,171 B1 * | 11/2021 | Suhling | ..................... | B62B 1/14 |
| 2004/0084864 A1 * | 5/2004 | Casey | ................... | B62B 5/0438 280/47.31 |
| 2006/0226628 A1 * | 10/2006 | Lindsay | ................. | A61G 5/128 280/250 |
| 2007/0079998 A1 * | 4/2007 | Walter | ..................... | B62B 1/20 180/19.1 |
| 2008/0029560 A1 * | 2/2008 | Pierce | ................... | A01C 15/122 222/622 |
| 2008/0185802 A1 * | 8/2008 | Fleming | .................... | B62B 1/22 280/47.18 |
| 2008/0197608 A1 * | 8/2008 | Dixon | ................... | A22B 7/006 280/654 |
| 2010/0270764 A1 * | 10/2010 | Odle | ......................... | B62C 1/04 280/727 |
| 2020/0239055 A1 * | 7/2020 | Carlson | ................... | B62B 5/061 |
| 2021/0244581 A1 * | 8/2021 | Anderson | ............ | A61G 1/0275 |

FOREIGN PATENT DOCUMENTS

| | | |
|---|---|---|
| CN | 202608817 | 12/2012 |
| CN | 202827653 | 3/2013 |
| CN | 203511702 | 4/2014 |
| JP | H05085362 | 4/1993 |

OTHER PUBLICATIONS

The Original, Ultra-Light, Collapsible, Single Wheeled, Hiking & Game Cart; https://web.archive.org/web/20170707144303/http://www.packwheel.com/; 6 pages.

Purchase a Pack Wheel lightweight hiking, or hunting cart.; https://web.archive.org/web/20120815185050/http://www.packwheel.com/; 3 pages.

* cited by examiner

MOTORIZED WEIGHT-BEARING DEVICE

CROSS-REFERENCE TO RELATED APPLICATIONS

This application claims priority to and the benefit of U.S. Provisional Patent Application No. 62/701,257, filed on Jul. 20, 2018, which is hereby incorporated by reference in its entirety.

BACKGROUND

Background and Relevant Art

Carrying a weight over long distances can be strenuous and potentially dangerous for a user. Weight-bearing devices having a wheel, a weight-bearing surface, and handles are often used to assist a user to carry a weight over long distances. Some weight-bearing devices may be motorized to assist the user in traveling long distances.

BRIEF SUMMARY

In some embodiments a weight-bearing device may include a single wheel configured to contact the ground. The weight-bearing device may include a motor connected to an output shaft and a first gear. A second gear may be connected to the single wheel with a unidirectional torque transfer device, the second gear and the first gear having a gear ratio of 8:1. A chain may be connected between the first gear and the second gear. A frame may be connected to the wheel, the frame having a weight-bearing surface tangential to the wheel, and a pair of handle connected to the frame.

In other embodiments, a weight-bearing device may include a single wheel with a hub radially centered in the wheel, the hub having a hub first end and a hub second end. A frame may be connected to the wheel with a frame first side connected to the hub first end and a frame second side connected to the hub second side. The frame may be rotatable relative to the wheel and include a weight-bearing surface. An electric motor and a pair of handles may be further attached to the frame. A first gear may be configured to be rotated by the electric motor. A second gear may be connected to the first gear by a chain and connected to the single with a unidirectional torque transfer device. A tooth count of the second gear may be eight times larger than a tooth count of the first gear.

In still other embodiments, a method for moving a weight may include securing a weight to a frame attached to a wheel and balancing the weight over the wheel. An electric motor may be engaged to rotate a first gear, which may rotate a second gear connected to the first gear with a chain, the second gear and the first gear having a gear ratio of greater than 8 to 1. The method may further include rotating the wheel.

This summary is provided to introduce a selection of concepts that are further described below in the detailed description. This summary is not intended to identify key or essential features of the claimed subject matter, nor is it intended to be used as an aid in limiting the scope of the claimed subject matter.

Additional features and advantages of embodiments of the disclosure will be set forth in the description which follows, and in part will be obvious from the description, or may be learned by the practice of such embodiments. The features and advantages of such embodiments may be realized and obtained by means of the instruments and combinations particularly pointed out in the appended claims. These and other features will become more fully apparent from the following description and appended claims, or may be learned by the practice of such embodiments as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which:

FIG. 2-1 is a side view of a weight-bearing device, according to at least one embodiment of the present disclosure;

FIG. 2-2 is another side view of the weight-bearing device of FIG. 2-1, according to at least one embodiment of the present disclosure;

FIG. 3-1 is a cross-sectional view of a gear, according to at least one embodiment of the present disclosure;

FIG. 3-2 is a plan view of a force spreader, according to at least one embodiment of the present disclosure;

FIG. 4-1 is a rear view of a weight-bearing device, according to at least one embodiment of the present disclosure;

FIG. 4-2 is a side view of a stiff support, according to at least one embodiment of the present disclosure;

FIG. 7-1 is a perspective view of a weight-bearing device, according to at least one embodiment of the present disclosure;

FIG. 7-2 is a top view of the weight-bearing device of FIG. 7-1, according to at least one embodiment of the present disclosure.

DETAILED DESCRIPTION

Figure 1:
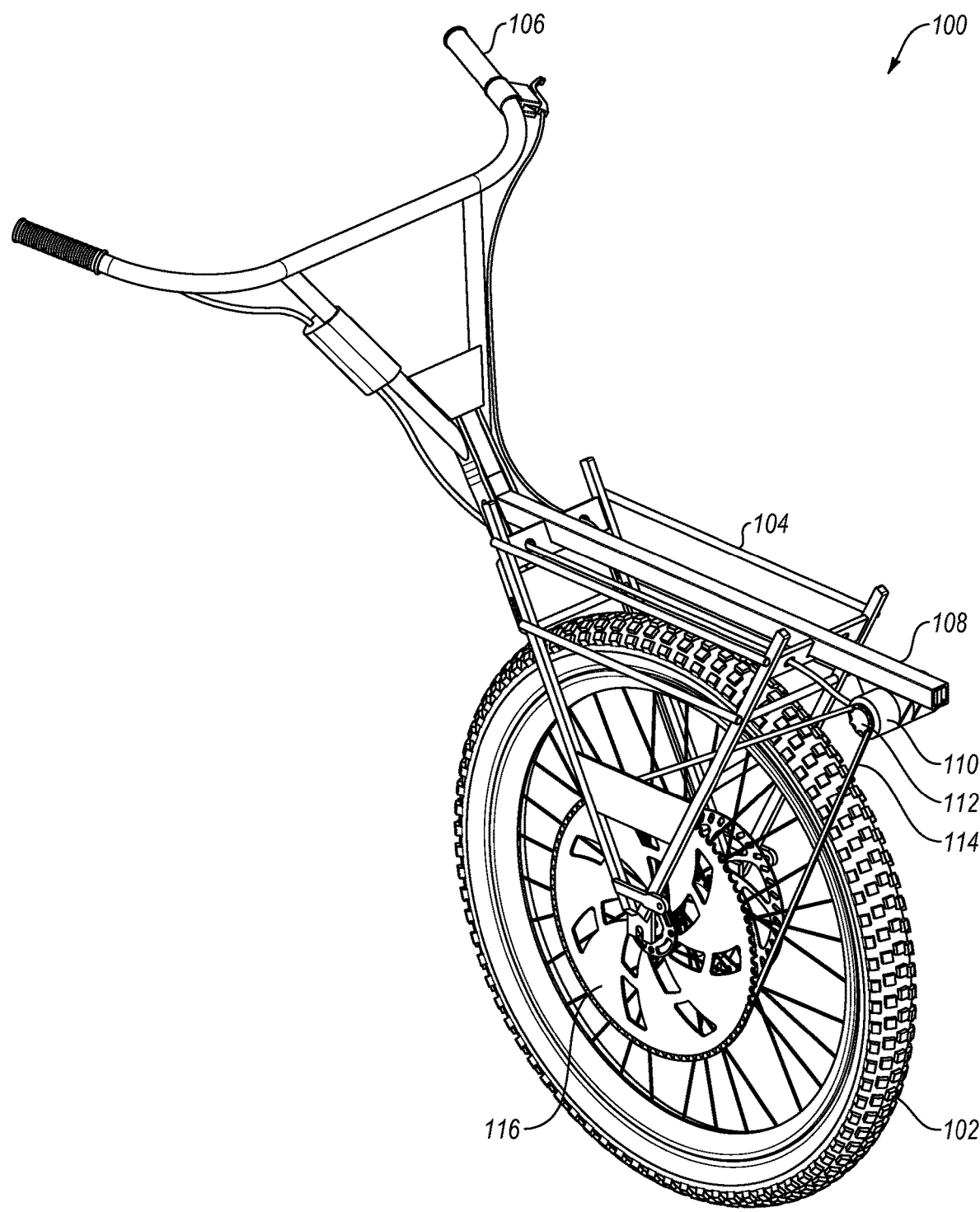
FIG. 1 is a perspective view of a weight-bearing device, according to at least one embodiment of the present disclosure.

This disclosure generally relates to devices and methods for moving a weight using a single wheel attached to a frame. Referring to FIG. 1, in some embodiments, a weight-bearing device 100 may include a single wheel 102.

The single wheel 102 may be rotatably connected to a frame 104. A pair of handles 106 may be connected to the frame. The frame 104 may include a weight-bearing surface 108. A motor 110 may be attached to the frame 104. In some embodiments, the motor 110 may be attached to the frame 104 at the weight-bearing surface 108. In other embodiments, the motor 110 may be attached to the frame 104 at another location.

The motor 110 may be attached to a first gear 112. A chain 114 may connect the first gear 112 to a second gear 116 attached to the single wheel 102. Engaging the motor 110 may rotate the first gear 112, which may rotate the second gear 116 due to the connection of the first gear 112 to the second gear 116 via the chain 114. Rotating the second gear 116 may cause the single wheel 102 to rotate. When the single wheel 102 is in contact with the ground, rotating the single wheel 102 may cause the whole weight-bearing device 100 to move in the direction of rotation.

Figures 1, 2:
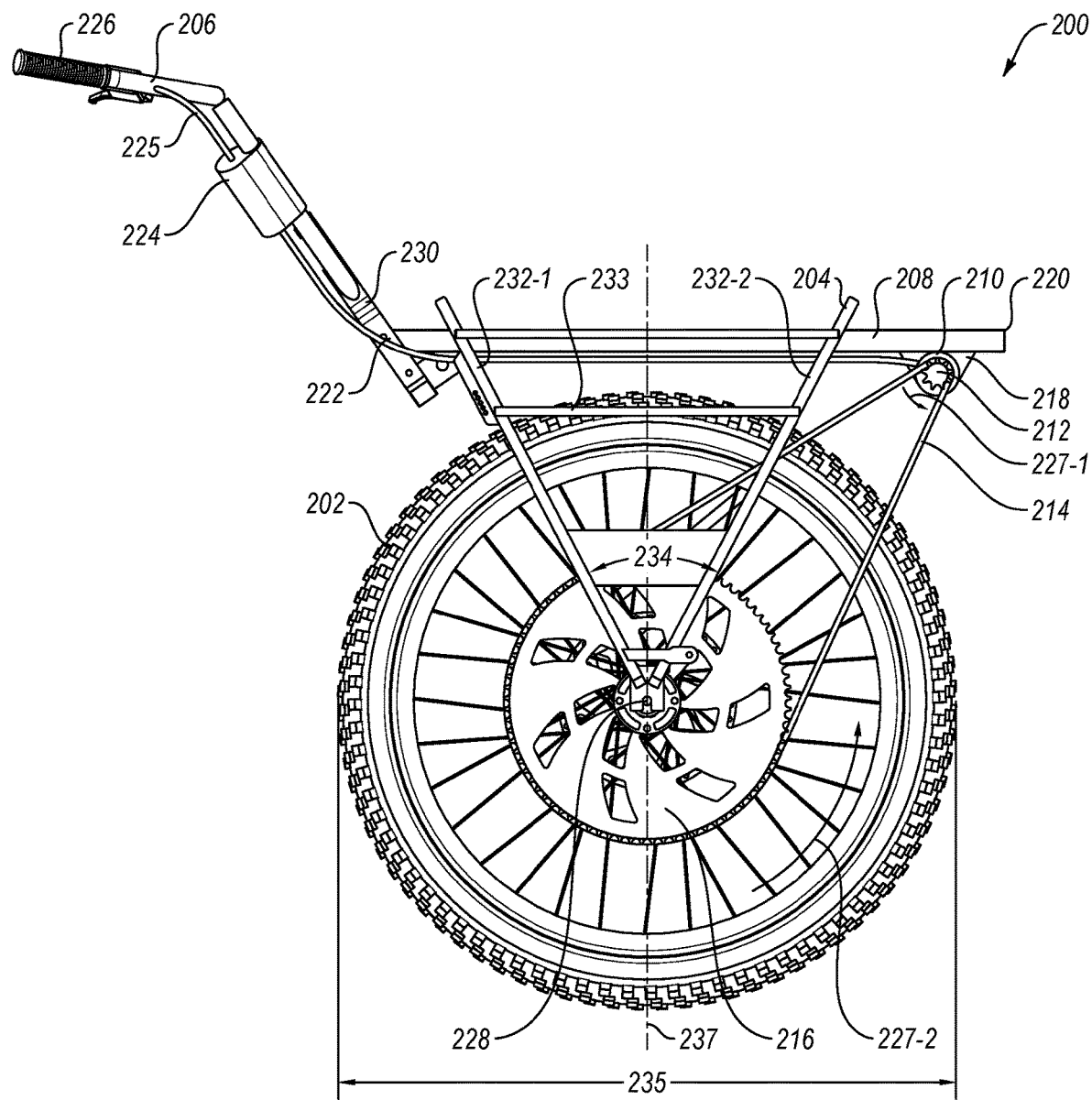
Figure 2:
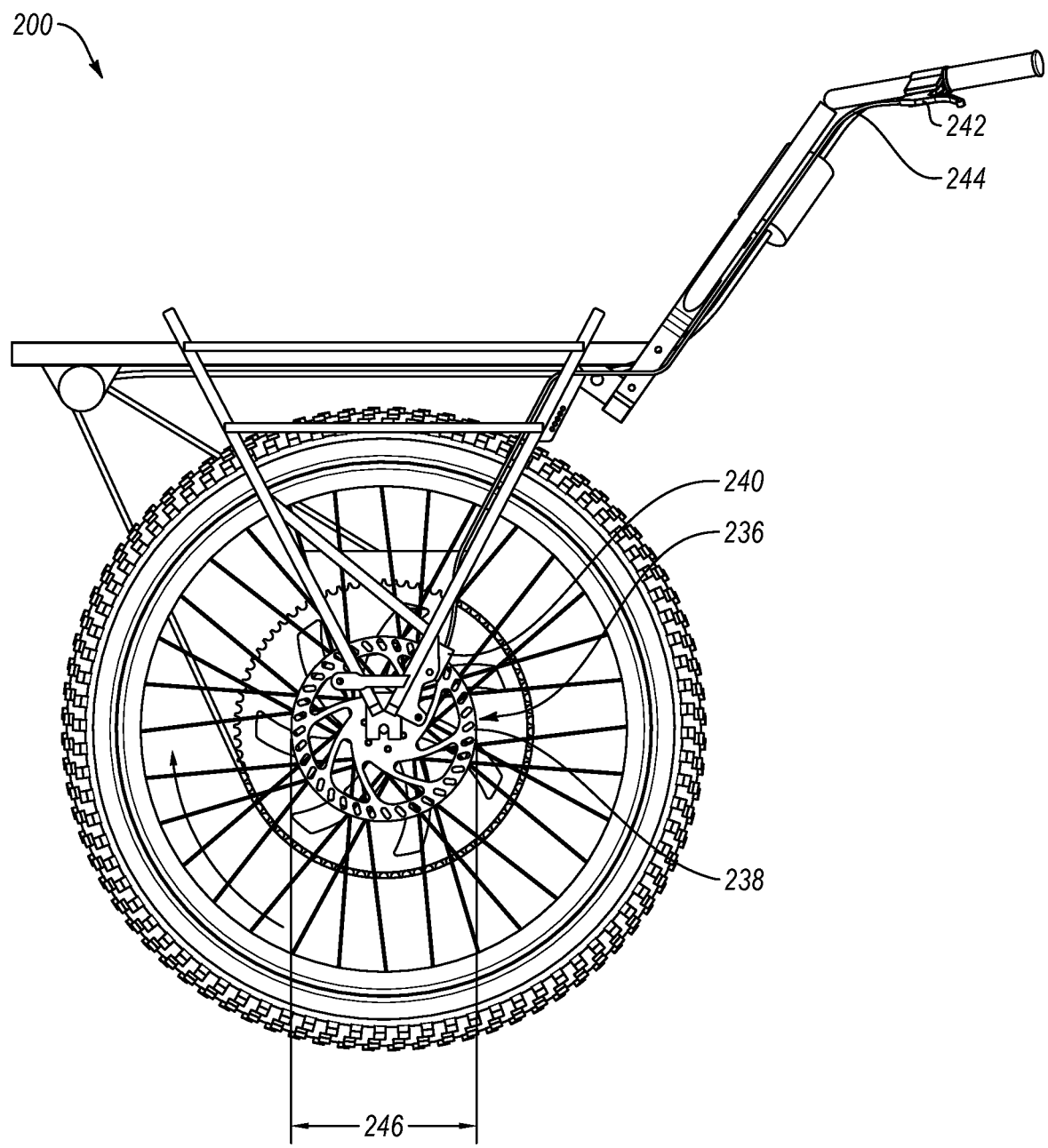

FIG. 2-1 is a side view of a weight-bearing device 200, according to at least one embodiment of the present disclosure. The weight-bearing device 200 may include a frame 204 attached to a single wheel 202. The motor 210 may include an output shaft rotationally fixed to a first gear 212. The first gear 212 may be connected to the second gear 216 with a chain 214, or in other words, the first gear 212 may be directly connected to the second gear 216 with the chain 214, or the first gear 212 may be coupled to the second gear 216 with the chain, or, in still further words, the first gear 212 may have a direct mechanical link with the second gear 216 without any other gears in between the first gear 212 and the second gear 216. For example, the direct mechanical link may be a chain such as the chain 214, or the direct mechanical link may be a belt, or other direct mechanical link.

The first gear 212 may have a first tooth count, which is the number of teeth around the circumference of the first gear 212. In some embodiments, the first tooth count may be 9. In other embodiments, the first tooth count may be 5, 6, 7, 8, 9 10, 11, 12, or any other value.

The second gear 216 may have a second tooth count, which is the number of teeth around the circumference of the second gear 216. In some embodiments, the second tooth count may be 81. In other embodiments, the second tooth count may be in a range having an upper value, a lower value, or upper and lower values including any of 60, 65, 70, 75, 80, 85, 90, 95, 100, or any value therebetween. For example, the second tooth count may be greater than 60. In another example, the second tooth count may be less than 100. In yet other examples, the second tooth count may be any value in a range between 60 and 100. It is worth noting that the largest sprocket of a conventional mountain bicycle cassette will traditionally have between 36 and 50 teeth. However, while mountain bicycles are optimized for cycling on a variety of terrain, sprockets having more than 50 teeth may result in a bicycle that moves too slowly to effectively control. The weight-bearing device 200 is configured to be used while walking, and therefore utilizing a second gear 216 with a high second tooth count may be conveniently used at a walking speed. Further, utilizing a second gear 216 with a high second tooth count may allow for a greater torque to be applied to the wheel 202.

In some embodiments, the spacing between individual teeth on the first gear 212 or the second gear 216 may be the same as the standard tooth spacing of a bicycle gear. Thus, the spacing between individual teeth on the first gear 212 or the second gear 216 may be approximately one half inch. Similarly the space between pins on the chain 214 may be the same as on a standard bicycle chain. Thus, the space between pins on the chain 214 may be approximately one half inch. In this manner, the chain 214 may be a standard bicycle chain.

In some embodiments, the second gear 216 and the first gear 212 may have a gear ratio of greater than 8.0, or, in other words, the second tooth count may be at least 8 times greater than the first tooth count. In some embodiments, the gear ratio may be in a range having an upper value, a lower value, or upper and lower values including any of 7.0, 7.5, 8.0, 8.5, 9.0, 9.5, 10.0, 10.5, 11.0, 11.5, 12.0, 12.5, or any value therebetween. For example, the gear ratio may be greater than 7.0. In another example, the gear ratio may be less than 12.5. In yet other examples, the gear ratio may be any value in a range between 7.0 and 12.5.

In some embodiments, the gear ratio contributes to the amount of torque and/or rotational velocity that is applied to the single wheel 202 from the motor 210. For example, the first tooth count may be 9, and the second tooth count may be 81, for a gear ratio of 9. Thus, the first gear 212 must rotate 9 times for every revolution of the second gear 216. A higher gear ratio will increase the number of rotations of the first gear 212 required to fully rotate the second gear 216. Therefore, for the same rotational velocity of the first gear 212, a second gear 216 with a greater second tooth count, or the gears with a higher gear ratio, will have a lower rotational velocity. Similarly, for a given force applied to the chain 214 by the motor 210, a larger gear ratio will result in a larger torque being applied to the wheel 202. A high torque applied to the wheel 202 may increase the ability of the weight-bearing device 200 to climb steep obstacles and/or inclines.

Similarly, for a constant first gear count, the force applied to the chain 214 by the rotation of the first gear 212 is constant. Increasing the second tooth count will increase the diameter of the second gear 216. As the diameter of the second gear increases, the force applied to the chain 214, transferred to the second gear 216, will result in a greater torque applied to the second gear 216. By fixing the second gear 216 to the single wheel 202, the torque applied to the second gear 216 will be transferred to the single wheel 202. A greater torque applied to the single wheel 202 may result in a higher weight carrying capacity, greater hill-climbing capability, a greater ability to roll over obstacles, or any combination of the above.

In some embodiments, the chain 214 may be protected using a chain guard. For example, the chain guard may protect the chain 214 from brush, trees, grass, equipment attached to the frame 204, and other items that may come into contact with the chain 214. In some embodiments, the chain guard may be a plastic or metal panel that may be attached to the frame 204.

In some embodiments, the motor 210 may be connected to the weight-bearing surface 208 with a motor connection 218 at an outer end 220 of the weight-bearing surface 208. In some embodiments, the motor connection 218 may be a fixed connection, such as welded, cast into, or otherwise fixedly connected to the weight bearing surface 208. In other embodiments, the motor connection 218 may be a movable connection. For example, the motor connection 218 may include one or more bolts inserted into a slot in the weight-bearing surface 208. Loosening the one or more bolts may enable the motor connection 218 to slide along a length of the weight-bearing surface 208, and tightening the one or more bolts may secure the motor connection in place. In other examples, the weight-bearing surface 208 may include multiple bolt holes for the one or more bolts, and the motor connection 218 may be moved along the length of the weight-bearing surface 208 by moving the one or more bolts between the multiple bolt holes. In still other examples, the motor connection 218 may be connected to the weight-bearing surface 208 using any type of movable connection known in the art.

Sliding the motor 210 along the weight-bearing surface 208 may change the gear distance between the center of the first gear 212 and the center of the second gear 216. For example, if the chain 214 stretched, then the motor 210 may be moved toward the outer end 220 to increase the gear distance to take up the slack from the chain stretch. In other examples, if one or more links of the chain 214 needed to be removed, the motor 210 may be moved toward the inner end 222 to shorten the gear distance and make room for the shortened chain 214. Further, changing the gear distance between the center of the first gear 212 and the center of the second gear 216 may change the tension of the chain 214. For example, sliding the motor 210 toward an outer end 220 of the weight-bearing surface 208 may increase the tension of the chain 214. Similarly, sliding the motor 210 toward an inner end 222 of the weight-bearing surface 208 may decrease the tension of the chain 214. In some embodiments, the motor may be completely removed.

In some embodiments, the motor 210 may be an electric motor powered by a power source, such as a battery pack 224. An electric motor 210 may reduce the weight of the weight-bearing device 200. Further, an electric motor 210 may reduce the operating noise of the weight-bearing device 200. Hunters may wish to reduce the operating noise of a weight-bearing device 200 because loud noises may scare away the game. In some embodiments, the battery pack 224 may be configured to be solar chargeable. Nevertheless, and in other embodiments, the motor 210 may have a power source that is a fossil-fuel, such as gasoline, diesel fuel, propane, or natural gas.

The motor 210 may be controlled by a throttle 226, the throttle 226 connected to the battery pack 224 and the motor 210 by a power cable 225. In some embodiments, the power cable 225 may be a mechanical cable. In other embodiments, the power cable 225 may be an electric cable configured to send electrical signals to the battery pack 224 and/or the motor 210. In some embodiments, the throttle 226 may be a twist or a grip throttle, configured to be actuated by twisting the throttle 226 located on a first handle of the handles 206. A twist throttle may be ergonomically favorable for a user when walking with the weight-bearing device 200. In other embodiments, the throttle 226 may be a trigger throttle, configured to be actuated using the fingers of a user's hand. In still other embodiments, the throttle 226 may be a thumb throttle, configured to be actuated by a user's thumb.

In some embodiments, the motor 210 may be a direct drive motor. Thus, an electric motor may be an electric direct drive motor. In this manner, the output of the motor, or the speed of rotation of the first gear 212, may be dependent upon the amount of actuation of the throttle 226, or on the twist amount of a twist throttle. For example, a twist throttle may be configured with a quarter-turn twist. The output of the motor 210 output may be at a maximum when the twist throttle is fully engaged, or at the full quarter-turn twist. As the twist throttle is returned from fully twisted to a resting state, the output of the motor 210 is reduced. Thus, when the twist throttle is half engaged, or at one-eighth twist, the output of the motor 210 may be roughly halved. In this manner, by regulating the extent of the actuation of the throttle 226, the output of the motor, and therefore the rotational velocity of the first gear 212, may be controlled. Thus, because the rotational velocity of the second gear 216 and the single wheel 202 is dependent upon the rotational velocity of the first gear 212, the rotational velocity of the single wheel 202 may be controlled by regulating the extent of the actuation of the throttle 226. Thus, the walking speed of the weight-bearing device 200 may be controlled by regulating the extent of the actuation of the throttle 226. However, in some embodiments, it may be desirable that the maximum rotational velocity (e.g., at full throttle) is below 4 miles per hour. In other embodiments, the maximum rotational velocity may be between 2 and 5 miles per hour. Having a maximum rotational velocity may prevent accidental over-acceleration which may result in tipping the weight-bearing device 200 which may damage the goods that are being carried.

In some embodiments, the motor 210 may be configured to rotate in a single direction. This direction may be a forward direction (e.g., direction 227-1). Thus, the second gear 216 may be configured to rotate the wheel 202 in a forward direction. In some embodiments, the second gear 216 may be connected to the wheel 202 with a unidirectional torque transfer device (e.g., a freewheel) that allows the second gear 216 to transfer torque in a first direction (e.g., direction 227-2), but allows the wheel to freely rotate in a second direction. For example, the second gear 216 may be connected to the wheel 202 with a bicycle free hub, as is commonly known in the art.

Because the second gear 216 is either rotationally fixed to the single wheel 202 or connected to the single wheel 202 with a unidirectional torque transfer device, the rotational velocity of the single wheel 202 is the same as the rotational velocity of the second gear 216. When the single wheel 202 is in contact with the ground, the rotational velocity of the single wheel 202 will determine a walking speed of the weight-bearing device 200. In some embodiments, the walking speed will be about three miles per hour, or in other words, the walking speed of an average hiker. In other embodiments, the walking speed will be variable between 0 and three miles per hour.

The motor 210 may resist rotation opposite the single direction of the motor 210. In some embodiments, the motor 210 may resist rotation only when engaged, meaning that the throttle 226 is at least partially actuated. In other embodiments, the motor 210 may actively resist rotation, even when not engaged. This may assist a user who is, for example, climbing a steep incline. When climbing a steep incline, the weight-bearing device 200 will have a tendency to roll downhill unless otherwise resisted by either the user or the motor. Using the motor to resist this tendency to roll downhill may help reduce user fatigue and potentially prevent accidents.

In other embodiments, the second gear 216 may be connected to the wheel 202 with a rotationally fixed connection. In this manner, the wheel 202 may be configured to only rotate at the rate proportional to that of the rotation of the motor 210. Thus, the rotation of the wheel 202 may be controlled only by adjusting the throttle 226. In this manner, the walking speed of the weight-bearing device 200 may be adjusted with a single control, rather than both a throttle 226 and a brake. Or, in other words, the motor 210 may be both a brake and a drive source for the wheel 202.

In some embodiments, the handles 206 may be a pair of handles 206. Each handle of the pair of handles 206 may be attached to a single handle support 230, which is in turn attached to the weight-bearing surface 208. In some embodiments, the handle support 230 may be attached to the weight-bearing surface 208 with a permanent connection. For example, the handle support 230 may be welded to the weight-bearing surface 208. In other embodiments, the handle support 230 may be releasably attached to the weight-bearing surface 208. For example, the handle support may be connected to the weight-bearing surface 208 with a bolt and nut. In other examples, the handle support 230 may be inserted into a complementarily shaped tube, with a pin inserted through the tube and the handle support 230. In this manner, the height of the handle support 230 may be variable.

A removable handle support 230 may allow a user to transport the weight-bearing device 200 compactly, and assemble it when needed. For example, a user may transport the weight-bearing device 200 in his vehicle with the handle removed, and assemble it when arriving at a desired location, such as at a trailhead or parking lot. In other examples, a user may carry the disassembled weight-bearing device 200 on his back, and assemble it at a desired location, such as at the location of a big-game animal.

In some embodiments, the handle support 230 may be rotatably attached to the weight-bearing device 200. The handle support 230 may be rotated such that it aligns or substantially aligns with the weight-bearing surface 208. In this manner, the weight-bearing device 200 may be transported compactly, with accompanying benefits as described above. In some embodiments, to aid in compact travel and the changing of flat tires, the wheel 202 may be connected to the frame 204 with a quick-release connection, as is known in the art for mountain bicycles.

In some embodiments, the frame 204 may include a plurality of support members 232-1, 232-2. The plurality of support members 232-1, 232-2 may be connected to the hub 228 with a connection angle 234. In some embodiments, the connection angle 234 may be less than 90°. In other embodiments, the connection angle 234 may be less than 100°. In still other embodiments, the connection angle 234 may be less than 120°. A smaller connection angle 234 may allow for a greater rotational freedom of the frame 204. A connection angle 234 of about 90° may provide for a stable weight-bearing surface 208 and a large rotational freedom. In some embodiments, two support members 232-1, 232-2 may be connected and reinforced by one or more cross-pieces 233. In some embodiments, the cross-pieces 233 may be parallel to the weight-bearing surface 208. In other embodiments, the cross-pieces may be non-parallel to the weight-bearing surface 208. In some embodiments, one or more of the cross-pieces 233 may be wide, such as a piece of plate metal. In this manner, the cross-pieces 233 may also provide some protection for the chain 214 and/or the second gear 216.

As mentioned above, the frame 204 is rotationally attached to the single wheel 202. In some embodiments, the frame 204 may be configured to have at least 270° of rotational freedom when the single wheel 202 is in contact with the ground. In other words, the frame 204 may freely rotate about the hub 228 of the wheel 202, and the rotational freedom is the extent to which the frame 204 may rotate about the hub 228 before any portion of the frame hits the ground. In other embodiments, the frame 204 may have between 250° and 270° of rotational freedom when the single wheel is in contact with the ground. In still other embodiments, the frame 204 may have between 230° and 270° of rotational freedom. A greater range of rotational freedom may allow the wheel 202 to engage more surfaces without catching on obstacles, or to be used on steep inclines and declines. In this manner, the weight-bearing device 200 may be configured for use in rough terrain.

In some embodiments, the weight-bearing surface 208 may be tangential to the single wheel 202. In this manner, regardless of the rotational orientation of the frame 204 relative to the single wheel 202, the weight-bearing surface 208 will always remain tangential to, or offset from and parallel to an imaginary line tangent to, an outer surface of the single wheel 202. Therefore, a user may load the frame 204 such that the user may operate the weight-bearing device 200 with the load balanced or substantially balanced over the wheel 202 and/or a hub 228 of the wheel 202.

In some embodiments, an unloaded frame 204 including the motor 210 and the battery pack 224 may be balanced such that a center of gravity of the unloaded frame 204 may be approximately in line with a gravitational axis 237, where the gravitational axis 237 is parallel to the force of gravity and runs through the hub 228 and perpendicular to the weight-bearing surface 208. The center of gravity may be adjusted by sliding the motor 210 along the weight-bearing surface 208.

The wheel 202 has a wheel diameter 235. In some embodiments, the wheel 202 may be a standard bike wheel. In some embodiments, the wheel 202 may be a standard mountain bike wheel. Therefore, the wheel diameter 235 may be any one of 24 inches, 26 inches, 27.5 inches, or 29 inches. A larger wheel may roll over obstacles better, or in other words give a smoother ride, but be heavier and/or less maneuverable. A smaller wheel may have a harder time surmounting obstacles, or in other words give a rougher ride, but may be lighter and/or more maneuverable. Further, a larger wheel may be easier for a taller user to manage, while a smaller wheel may be easier for a shorter user to manage.

In some embodiments, the wheel 202 may include a tire with an internal inner tube. In some embodiments, the inner tube may be inflated to a pressure of between 15 and 35 pounds per square inch (psi). In other embodiments, the inner tube may be inflated to a pressure of between 15 and 25 psi, or 15 and 20 psi. A lower pressure may increase traction of the tire and increase the shock resistance of the tire, but increase the risk of a punctured tire.

In other embodiments, the wheel 202 may be a tubeless tire. The tubeless tire may be inflated to a pressure of between 13 and 30 psi, or between 13 and 25 psi, or between 13 and 20 psi. Generally, lower pressures increase the shock resistance and traction of a tire, but may increase the risk of a flat tire. In still other embodiments, the wheel 202 may be a solid rubber tire.

In some embodiments, the wheel 202 may be a standard rim and spoke tire. For example, the wheel 202 may include a plurality of spokes that extend from a rim to a hub. In other embodiments, the wheel 202 may be a disc wheel.

FIG. 2-2 is a side view of the weight-bearing device 200 of FIG. 2-1. In some embodiments, the weight-bearing device 200 may include a brake 236. In some embodiments, the brake 236 may be a standard bicycle brake. For example, the brake 236 may be a caliper brake. In other examples, the brake 236 may be a disc brake. The disc brake may include a rotor 238 and brake pads 240. As the brake pads 240 engage the rotor 238, which is rotationally fixed to the wheel 202, the rotational velocity of the rotor 238, and therefore the wheel 202, may be reduced. Thus, the walking speed of the weight-bearing device 200 may be reduced by actuating the brake 236.

In some embodiments, the brake 236 may be actuated by a brake actuator 242. In some embodiments, the brake actuator 242 may be a trigger brake actuator. In other embodiments, the brake actuator 242 may be a twist or grip brake actuator. The brake actuator 242 may be connected to a brake line 244, which may transmit actuation of the brake actuator 242 to the brake pads 240. In some embodiments, the brake line 244 may include a cable, making the brake 236 a mechanical brake. In other embodiments, the brake line 244 may be a hydraulic brake line, making the brake 236 a hydraulic brake.

In some embodiments, the rotor 238 may be a standard bicycle disc brake rotor. The rotor 238 may have a nominal rotor diameter 246 of any one of 140 millimeters (mm), 160 mm, 180 mm, or 200 mm. In some embodiments, the rotor diameter 246 may be a non-standard bicycle disc brake rotor, having a rotor diameter 246 that may be any value between 140 mm and 200 mm, or greater than 200 mm. A larger rotor diameter 238 may provide greater braking power for the same force applied by the actuator. Thus, for long, steep descents, a rotor diameter 246 of, for example, 203 mm may help reduce a user's hand fatigue by requiring the user to grip the brake actuator 242 with less force.

In some embodiments, the brake 236 and the first gear (e.g., first gear 212 of FIG. 2-1) and the second gear (e.g., second gear 216 of FIG. 2-1) may be located on opposite sides of the wheel 202. Locating the brake 236 opposite the first gear and the second gear may reduce the chance for interferences between the brake 236 and the first gear and the second gear. In other embodiments, the brake 236 and the first gear and the second gear may be located on the same side of the wheel 202.

A traditional bicycle hub is configured to transfer torque from a cassette that includes between 6 and 11 sprockets or gears. The torque transferred from the cassette is therefore distributed evenly or approximately evenly across a section of the mountain bike hub. Further, the largest sprocket or gear on the cassette may have a as many as 50 teeth, and commonly fewer teeth, thereby affecting the torque applied to a bicycle hub through a conventional cassette.

Figures 1, 3:
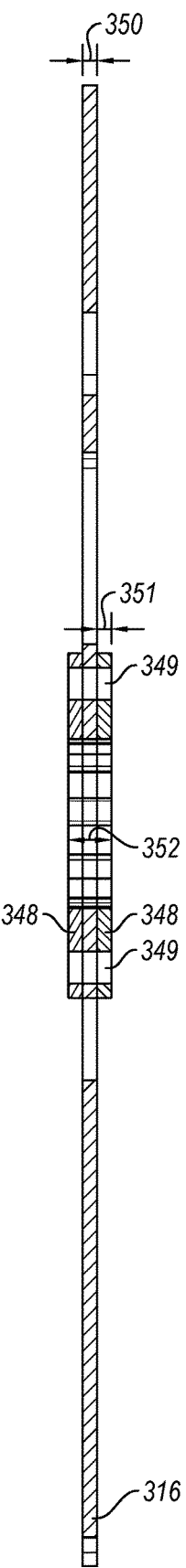
Figures 2, 3:
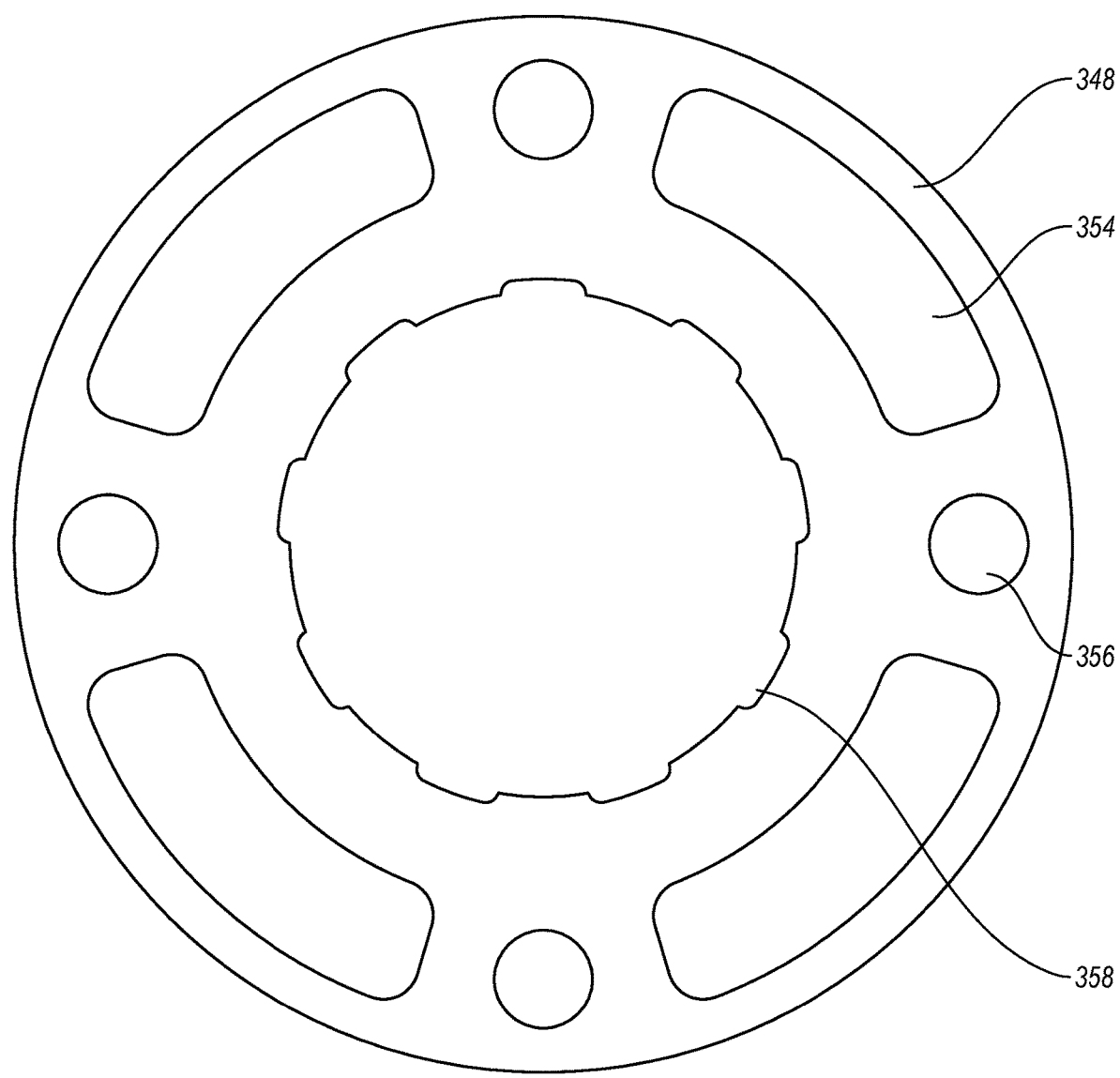

FIG. 3 is an end or radial view of a second gear 316, according to at least one embodiment of the present disclosure. In some embodiments, the torque applied through the second gear 316 to the hub (e.g., hub 228 of FIG. 2-1) may not only be greater than that applied through a conventional cassette, but it may also be applied to the hub in a more localized or focused location. To spread this torque across a greater area of the hub, one or more force spreaders 348 may be secured to the second gear 316.

In some embodiments, the second gear 316 may have a gear thickness 350 in a range having an upper value, a lower value, or upper and lower values including any of 1.50 mm, 1.55 mm, 1.60 mm, 1.65 mm, 1.70 mm, 1.75 mm, 1.80 mm, 1.85 mm, 1.90 mm, 1.95 mm, 2.00 mm, 2.1 mm, 2.2 mm, 2.3 mm, 2.4 mm, 2.5 mm, 2.6 mm, 2.7 mm, 2.8 mm, or any value therebetween. For example, the gear thickness 350 may be greater than 1.50 mm. In another example, the gear thickness 350 may be less than 3.0 mm. In yet other examples, the gear thickness 350 may be any value in a range between 2.50 mm and 3.00 mm. In some embodiments, the gear thickness 350 may be compatible with a chain thickness (e.g., thickness of the chain 214 of FIG. 2-1). In some embodiments, it may be critical that the gear thickness 350 is sized to accept a standard bicycle chain. For example, it may be critical that the gear thickness 350 is about 2.78 mm.

In some embodiments, the force spreader 348 may have a force spreader thickness 351 in a range having an upper value, a lower value, or upper and lower values including any of 1.50 mm, 1.60 mm, 1.70 mm, 1.80 mm, 1.90 mm, 2.00, 2.10 mm, 2.20 mm, 2.30 mm, 2.40 mm, 2.50 mm, 2.60 mm, 2.70 mm, 2.80 mm, 2.90 mm, 3.00 mm, or any value therebetween. For example, the force spreader thickness 351 may be greater than 1.50 mm. In another example, the force spreader thickness 351 may be less than 3.0 mm. In yet other examples, the force spreader thickness 351 may be any value in a range between 1.50 mm and 3.00 mm.

In some embodiments, the force spreader 348 may be configured to increase a contact length 352 along the hub. In some embodiments, the contact length 352 may be in a range having an upper value, a lower value, or upper and lower values including any of 3.0 mm, 3.2 mm, 3.4 mm, 3.6 mm, 3.8 mm, 4.0 mm, 4.2 mm, 4.4 mm, 4.6 mm, 4.8 mm, 5.0 mm, or any value therebetween for a single force spreader 352. For example, the contact length 352 may be greater than 3.0 mm. In another example, the contact length 352 may be less than 5.0 mm. In yet other examples, the contact length 352 may be any value in a range between 3.0 mm and 5.0 mm. In some embodiments, the contact length 352 may be in a range having an upper value, a lower value, or upper and lower values including any of 4.5 mm, 5.0 mm, 5.5 mm, 6.0 mm, 6.5 mm, 7.0 mm, 7.5 mm, 8.0 mm, 8.5 mm, 9.0 mm, or any value therebetween for two force spreaders 352. For example, the contact length 352 may be greater than 4.5 mm. In another example, the contact length 352 may be less than 9.0 mm. In yet other examples, the contact length 352 may be any value in a range between 4.5 mm and 9.0 mm.

In some embodiments, a single force spreader 348 may be used on one side of the second gear 316. In other embodiments, a force spreader 348 may be used on either side of the second gear 316. In still other embodiments, multiple force spreaders 234 may be used on one or both sides of the second gear 316.

In some embodiments, the force spreader 348 may be connected to the second gear 316 with a bolted connection. In other embodiments, the force spreader 348 may be connected to the second gear 316 with a screw connection. In still other embodiments, the force spreader 348 may be connected to the second gear 316 with a welded connection. In some embodiments, the one or more force spreaders 348 may be abutting the second gear 316. In other embodiments, one or more force spreaders 348 may be spaced from the second gear 316. For example, nylon spacers may space one or more force spreaders from the second gear 316.

In some embodiments, the second gear 316 may not be connected to any force spreaders 348. For example, a body of the second gear 316 may increase in thickness from the outer circumference of the second gear 316 to the center of the second gear 316.

FIG. 3-2 is a top down view of a force spreader 348, according to at least one embodiment of the present disclosure. In some embodiments, the force spreader 348 may include one or more cut-outs 354. Multiple cut-outs 354 may be included in the force spreader 348 to decrease the weight and/or rotational inertia of the force spreader 348.

In some embodiments, the force spreader 348 may include one or more connector holes 356, configured to connect to the force spreader 348 to the second gear (e.g., second gear 316 of FIG. 3-1).

In some embodiments, the force spreader 348 may include a hub connector 358 configured to connect the force spreader 348 to the hub (e.g., hub 228 of FIG. 2-1). The hub connector 358 may be a series of ridges, indentations, or notches in the central bore of the force spreader 348. The pattern of the hub connector 358 may be the same pattern found on the gear and the hub of the wheel. In some embodiments, there may be a total of 9 ridges and indentations on the hub connector 358. In this manner, by aligning the hub connector 358 with similar patterned connectors on a gear (e.g., gear 316 of FIG. 3-1) or other hub connectors 358, the contact length (e.g., contact length 352 of FIG. 3-1) may be increased, thereby spreading the applied torque loading on the hub.

Figures 1, 4:
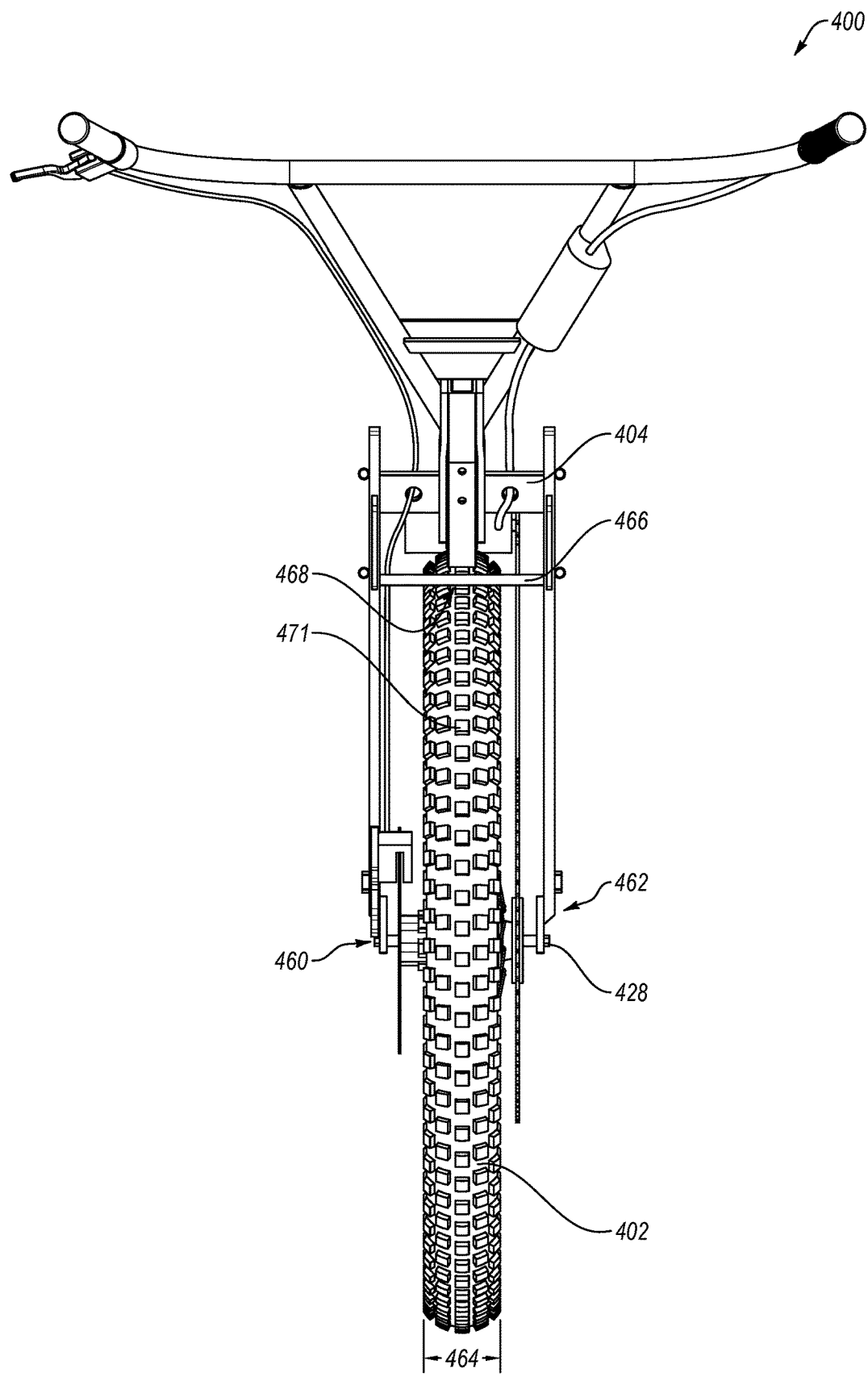
Figures 2, 4:
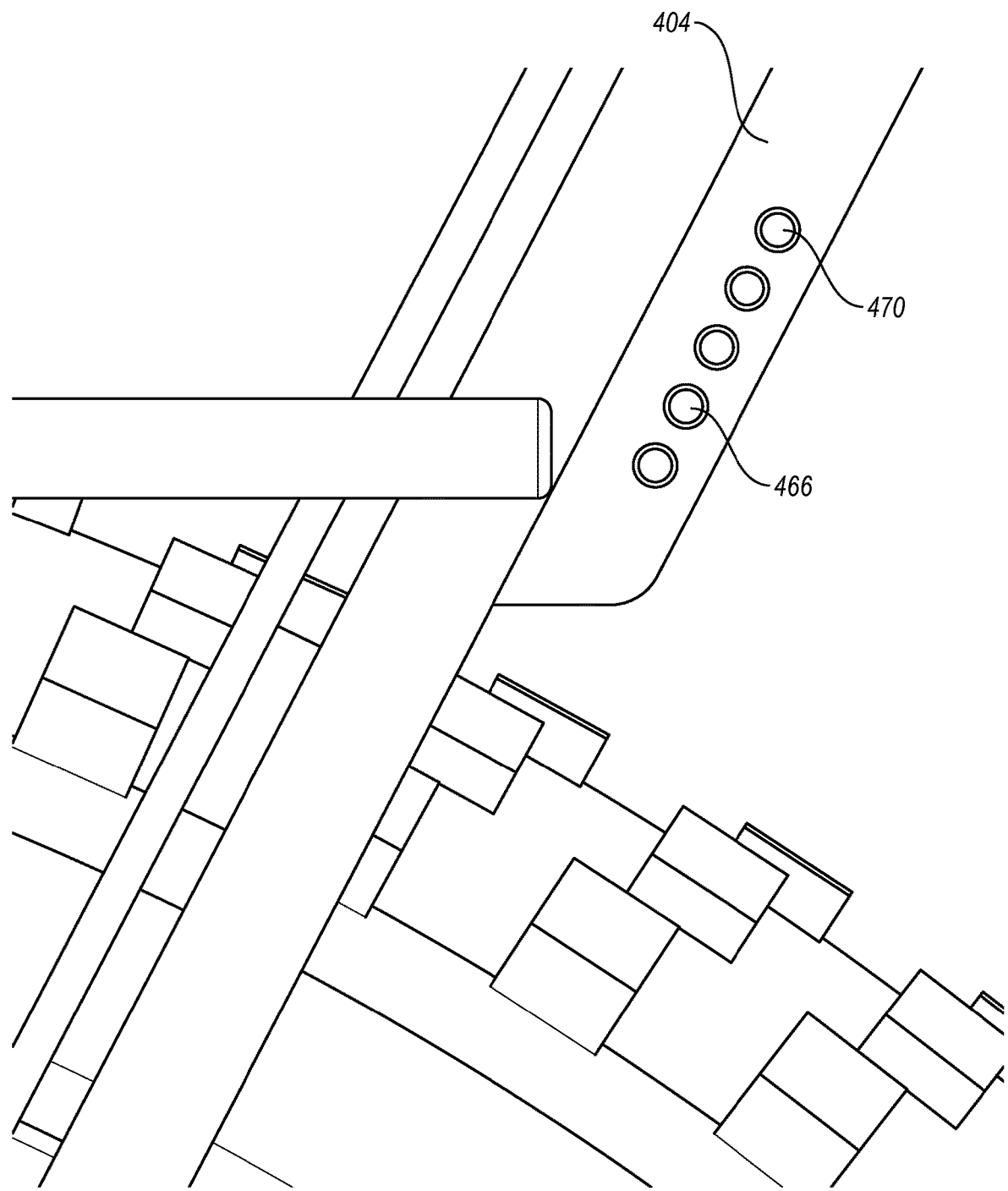

FIG. 4-1 is a rear view of a weight-bearing device 400, according to at least one embodiment of the present disclosure. In some embodiments, a wheel 402 may have a hub 428. A frame 404 may have a first side 460 and a second side 462, and a weight-bearing surface (e.g., weight-bearing surface 208 of FIG. 2-1) running between the first side 460 and the second side 462. The first side 460 and second side 462 of the frame 404 may be connected to the first side 460 and second side 462 of the hub 428. In some embodiments, the first side 460 and the second side 462 of the frame 404 may be parallel or approximately parallel.

A wheel 402 may be placed between the first side 460 and the second side 462 of the frame 404. In some embodiments, the wheel may have a tire width 464 in a range having an upper value, a lower value, or upper and lower values including any of 1.0 inch (in.), 1.25 in., 1.5 in., 1.75 in., 2.0 in., 2.25 in., 2.5 in., 2.75 in., 3.0 in., 3.5 in., 4.0 in., 4.5 in., 5.0, in, 5.5, in., 6.0 in., or any value therebetween. For example, the tire width 464 may be greater than 1.0 in. In another example, the tire width 464 may be less than 6.0 in. In yet other examples, the tire width 464 may be any value in a range between 1.0 and 6.0 in. In some embodiments, a larger tire width 464 may spread the force of the weight on the weight-bearing device 400 over a larger area, thereby reducing the amount that the wheel 402 may sink in soft terrain, such as mud, sand, or snow. A smaller tire width 464 may take less torque to roll, but may be more susceptible to sinking in soft terrain.

In some embodiments, a stiff support 466 may extend between the first side 460 and the second side 462 of the frame 404 directly above the wheel 402. The stiff support 466 may be positioned along the frame 404 such that it has a clearance 468 between an outer surface of the wheel 402 and the stiff support 466. In some embodiments, the clearance 468 may be in a range having an upper value, a lower value, or upper and lower values including any of 1 mm, 2 mm, 3 mm, 4 mm, 5 mm, 6 mm, 7 mm, 8 mm, 9 mm, 10 mm, 11 mm, 12 mm, or any value therebetween. For example, the clearance 468 may be greater than 1 mm. In another example, the clearance 468 may be less than 12 mm. In yet other examples, the clearance 468 may be any value in a range between 1 mm and 12 mm.

In some embodiments, the stiff support 466 may be positioned such that any mud, snow, or other debris that may collect on the wheel 402 may come into contact with the stiff support 466. Because the stiff support 466 is a stiff and/or rigid member, the stiff support 466 may knock all or at least a portion of the collected debris from the wheel 402. In this manner, the stiff support 466 may clean the wheel 402. A clean wheel 402 may expose one or more tread 471 of the wheel 402, which may thereby increase traction of the wheel 402 with the ground and improve rolling of the wheel 402. The clearance 468 is critical to how much debris the stiff support 466 may remove from the wheel 402. For example, a smaller clearance 468 may remove a greater amount of collected debris. In other examples, a larger clearance 468 may be more effective at removing large debris such as rocks or sticks.

In some embodiments, the stiff support 466 may be a wire strung between the first side 460 and the second side 462 of the frame 404. In other embodiments, the stiff support 466 may be a rod or a beam attached to the frame 404. In some embodiments, the stiff support 466 may be adjustable. For example, the stiff support 466 may be configured to screw into one or both sides of the frame 404. In other examples, the stiff support may be a bolt, with the bolt head contacting the first side 460 and the bolt nut contacting the second side 462 of the frame 404, or vice versa. Thus, the stiff support 466 may connect between the first side 460 and the second side 462 in a straight or substantially straight manner.

FIG. 4-2 is a side view of the first side (e.g., first side 460 of FIG. 4-1) of the frame 404 at the location of the stiff support 466. In some embodiments, the frame 404 may include a plurality of support locations 470. A stiff support 466 may be inserted into one of the support locations 470. In some embodiments, a stiff support 466 may be inserted into each of the support locations 470. Each support location 470 has a different clearance (e.g., clearance 468 of FIG. 4-1). In some embodiments, the frame 404 may include one, two, three, four, five, six, or more support locations 470. Thus, by adjusting which support location 470 the stiff support 466 is inserted into, the clearance may be adjusted. In some embodiments, multiple stiff supports 466 may be inserted into multiple support locations 470. Multiple stiff supports 466 may provide greater strength for removing sticky or strong debris from the wheel 402. In some embodiments, a stiff support may connect to different support locations 470 on different sides of the frame 404. For example, a stiff support 466 may be connected to an upper support location 470 on a first side of the frame 404 and a lower support location 470 on a second side of the frame 404. In other examples, a first wire may be strung between an upper support location 470 on a first side of the frame 404 and a lower support location 470 on a second side of the frame 404 and a second wire may be strung between a lower support location 470 on a first side of the frame 404 and an upper support location 470 on a second side of the frame 404, thereby creating an "x" shaped stiff support 466.

Figure 5:
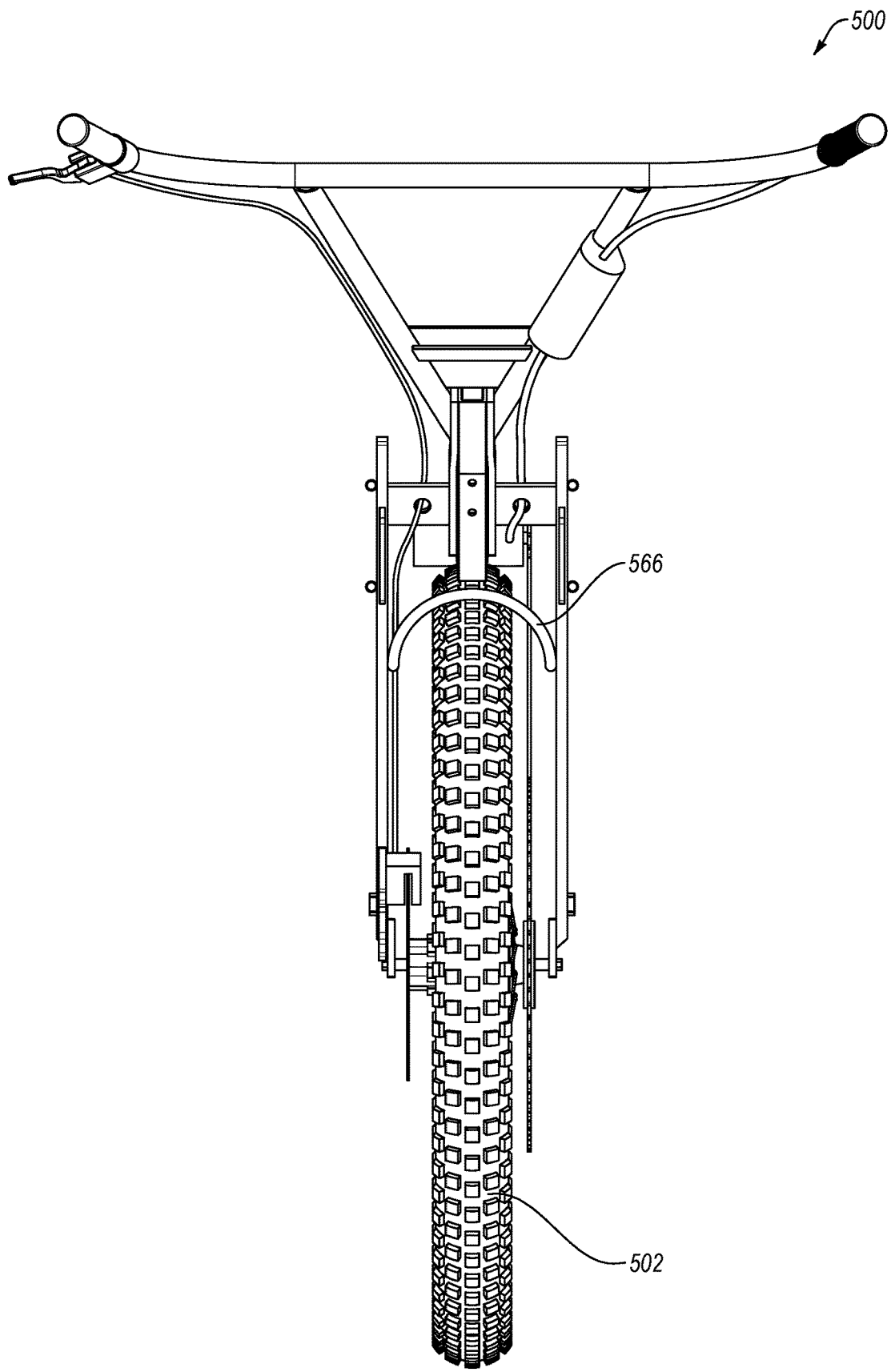
FIG. 5 is a rear view of a stiff support, according to at least one embodiment of the present disclosure.

FIG. 5 is another rear view of a weight-bearing device 500, according to at least one embodiment of the present disclosure. In some embodiments, the stiff support 566 may have a non-straight shape. For example, the stiff support 566 may have a curved or arcuate shape, similar to an outer profile of the wheel 502. Changing the shape of the stiff support 566 may change the capacity of the stiff support to clear debris from the wheel 502. For example, a stiff support 566 with a curved or arcuate shape, similar to the outer profile of the wheel 502, may clear debris not only from the outermost edge of the wheel 502, but from the entire contact surface of the wheel 502.

Similarly, the stiff support 566 may have many different shapes, such as chevron, inverted chevron, sinusoidal, and other shapes.

Figure 6:
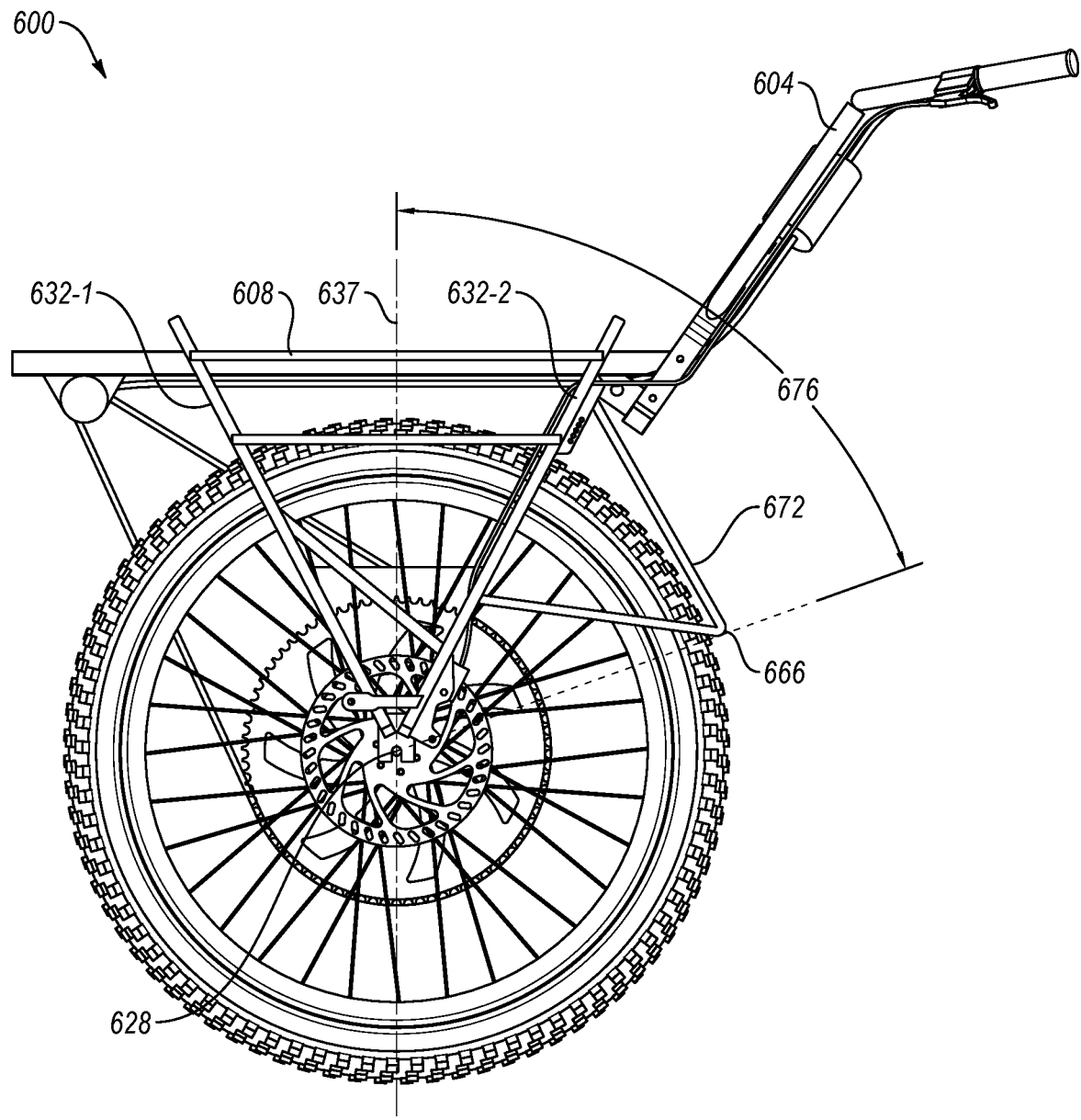
FIG. 6 is a side view of a weight-bearing device, according to at least one embodiment of the present disclosure.

FIG. 6 is a side view of the weight-bearing device 600, according to at least one embodiment of the present disclosure. In some embodiments, a stiff support structure 672 may offset the location of the stiff support 666 from the support members 632-1, 632-1 of the frame 604.

In some embodiments, the location of the stiff support 666 may be offset from a gravitational axis 637 with an offset angle 676, where the gravitational axis 637 is parallel to the force of gravity and runs through the hub 628 and perpendicular to the weight-bearing surface 608. In some embodiments, the offset angle 676 may be in a range having an upper value, a lower value, or upper and lower values including any of 50°, 55°, 60°, 65°, 70°, 75°, 80°, 85°, 90°, or any value therebetween. For example, the offset angle 676 may be greater than 50°. In another example, the offset angle 676 may be less than 90°. In yet other examples, the offset angle 676 may be any value in a range between 50° and 90°.

Offsetting the location of the stiff support 666 may help prevent the amount of debris that is kicked up to the user as the user walks. A larger offset angle 676 may reduce the amount of debris kicked up to the user as the user walks.

Figures 1, 7:
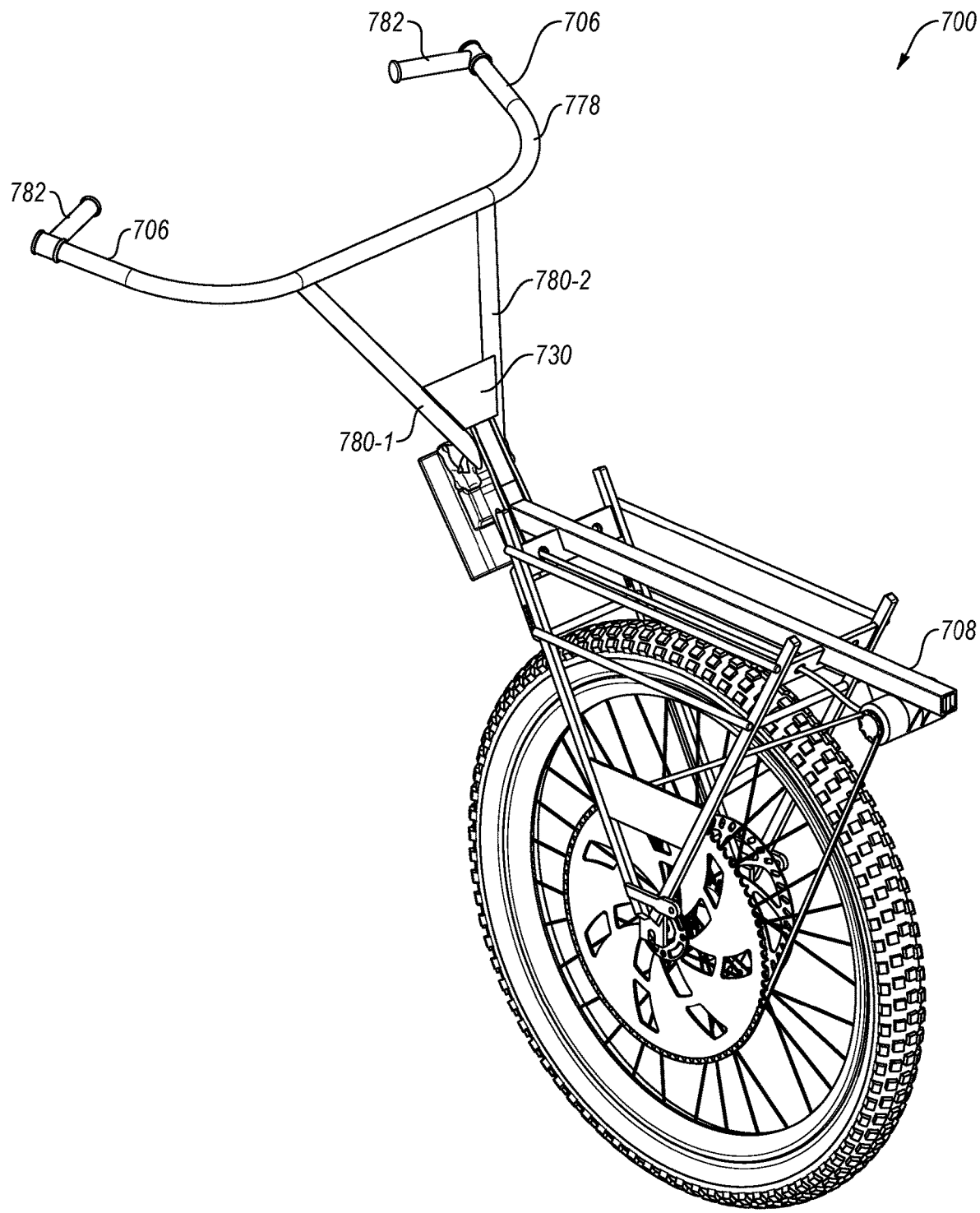
Figures 2, 7:
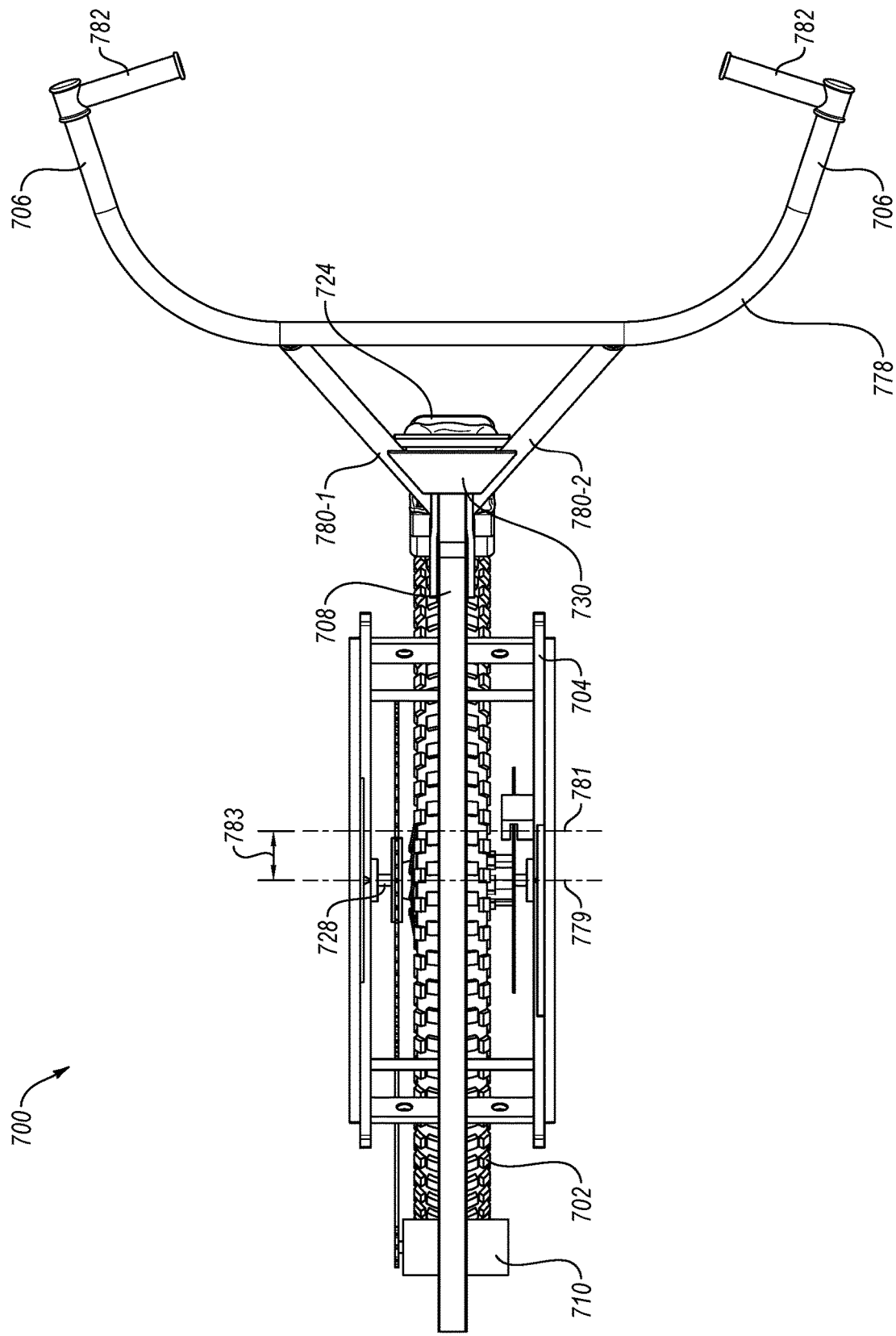

FIG. 7-1 is perspective view of a weight-bearing device 700, according to at least one embodiment of the present disclosure. In some embodiments, the weight-bearing device 700 may have a pair of handles 706 connected to a handle support 730. The pair of handles 706 may be connected to a handlebar 778. In some embodiments, the handlebar 778 may be curved into a U-shape. In other embodiments, the handlebar 778 may be straight. In still other embodiments, the handlebar 778 may be straight with the handles 706 extending out perpendicular to the handlebar 778.

In some embodiments, the handle support 730 may consist of two handle support members 780-1, 780-2 extending from the weight-bearing surface 708 to connect to the handlebar 778. In other embodiments, the handle support 730 may be a single support member that connects to the handlebar 778 and the weight-bearing surface 708.

In some embodiments, each handle 706 may include a climbing handle 782 perpendicular or approximately perpendicular to the handle 706. The climbing handle 782 may be a more ergonomically favorable position for a user to place her hands when climbing up an incline. For example, when climbing an incline, a user may balance the load over the hub. This may be accomplished by lifting the handles 706 and rotating the frame. In this manner a weight secured to the weight-bearing surface 708 may be supported by the weight-bearing device 700, rather than by a user's hands. Balancing the load over the hub may, however, cause the handles 706 to be lifted above a comfortable level for walking. For example, the user's hands may be lifted to chest height, shoulder height, head height, or above the head. Therefore, the user may grip the weight bearing device 700 with the climbing handles. The climbing handles 782 may be more ergonomically favorable to hold when the handles 706 and the climbing handles 782 are in an elevated position because the user will not have to twist her arm uncomfortably to maintain hold of handles 706. In some embodiments, one or both of the climbing handles 782 may include one or both of a throttle (e.g., throttle 226 of FIG. 2-1) and a brake (e.g., brake 236 of FIG. 2-2).

FIG. 7-2 is a top-down view of the weight bearing device 700 of FIG. 7-1, according to at least one embodiment of the present disclosure. In some embodiments, the climbing handles 782 may be perpendicular or approximately perpendicular to the handles 706. In other embodiments, the climbing handles 782 may be parallel to a user's chest. In still other embodiments, the climbing handles 782 may be parallel to the handlebar 778. The specific orientation of the climbing handles 782 may increase or decrease the comfort of the user as he is using the weight-bearing device 700. In some embodiments, the orientation of the climbing handles 782 relative to the handles 706 and/or the handlebar 778 may be adjustable to a user's preferences.

In some embodiments, the climbing handles 782 may be permanently attached to the handles 706 and/or the handlebar 778. In other embodiments, the climbing handles 782 may be releasably attached to the handles 706 and/or the handlebar 778.

In some embodiments, the climbing handles 782 may be oriented parallel to the ground when the weight-bearing surface 708 is parallel to the ground. In other embodiments, the climbing handles 782 may be pointed upward relative to the ground when the weight-bearing surface 708 is parallel to the ground, or in other words, may be pointed toward the sky. In still other embodiments, the climbing handles 782 may be pointed downward relative to the ground when the weight-bearing surface 708 is parallel to the ground, or in other words, may be pointed toward the ground. In some embodiments, the orientation of the climbing handles 782 relative to the ground may be fixed. In other embodiments, the orientation of the climbing handles 782 relative to the ground may be adjustable to a user's preferences. The orientation of the climbing handles 782 relative to the ground may increase or decrease the comfort of a user as he is using the weight-bearing device 700.

In some embodiments, the climbing handles 782 may be located on the inside of the handlebar 778, or in other words, may point toward the wheel or the weight-bearing surface 708. In other embodiments, the climbing handles 782 may be located on the outside of the handlebar 778, or in other words, may point away from the wheel 702 or the weight bearing-surface 708. Climbing handles 782 located on the inside of the handlebar 778 have a narrower distance between the grips. This may decrease the overall width of the weight-bearing device 700, thereby making it easier to maneuver in narrow spaces, brush, and/or trees. Climbing handles 782 located on the outside of the handlebar 778 may have a wider distance between the grips. This may increase the stability of the weight-bearing device 700 by allowing a user to fine-tune lateral motion and directional controls.

The weight-bearing device has a hub axis 779, which is the axis that runs through the center of the hub 728 and the center of the wheel 702. The frame 704 has a center of mass that is located on a center of mass axis 781. In some embodiments, the unloaded frame 704 may have a center of mass axis 781 that is the same as the hub axis 779, or in other words, the unloaded frame 704 may have a center of mass that is centered over the hub when the weight bearing surface 708 is perpendicular to the force of gravity. In other embodiments, the unloaded frame 704 may have a center of mass axis 781 that is offset from the hub axis 779 with an offset distance 783 when the weight bearing surface 708 is perpendicular to the force of gravity. In some embodiments, the center of mass axis 781 may be offset toward the handles 706. In other embodiments, the center of mass axis 781 may be offset toward the motor 710. In some embodiments, the offset distance 783 may be in a range having an upper value, a lower value, or upper and lower values including any of 0 in., 0.5 in., 1.0 in., 1.5 in., 2.0 in., 2.5 in., 3.0 in., 3.5 in., 4.0 in., 4.5 in., 5.0 in., 5.5 in., 6.0 in., or any value therebetween. For example, the offset distance 783 may be less than 6.0 in. In another example, the offset distance 783 may be less than 4.0 in. In yet other examples, the offset distance 783 may be less than 3.0 in. A smaller offset distance 783 may increase the ease with which the weight-bearing device 700 is operated by decreasing the amount of weight that is carried by the user with the handles 706 and/or the climbing handles 782.

The offset distance 783 may be affected based on the location, size, and/or weight of various elements of the frame, including the battery pack 724, the motor 710, the handlebar 778 and handles 706, the climbing handles 782, or any combination of one or more of the foregoing. In some embodiments, the offset distance 783 may be optimized based on the location of the various components. For example, the location of the motor 710 may be adjusted. If the motor 710 is moved toward the handlebar 778, then the center of mass axis 781 may move toward the handlebar 778. If a larger motor 710 is used, or in other words a heavier motor, then the center of mass axis 781 may move toward the motor. Similarly, if a larger battery pack 724 is used, then the center of mass axis 71 may move toward the handles 706.

In some embodiments, the location of the center of mass axis 781 may be determined at least in part by the amount and configuration of weight that is loaded on the frame 704. A user may load the frame 704 such that, when loaded, the offset distance 783 is less than 4 in.

Figure 8:
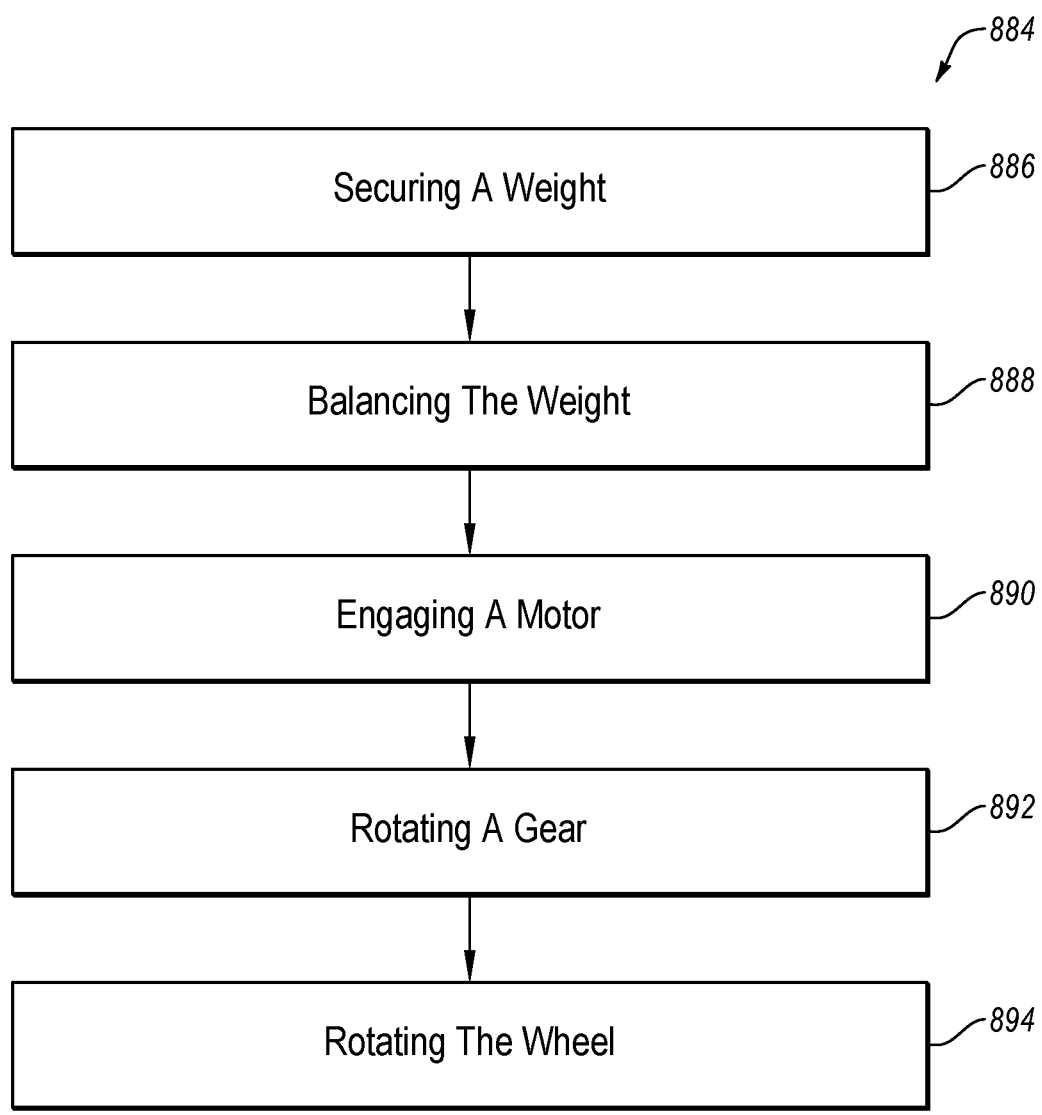
FIG. 8 is a method chart for a method for moving a weight, according to at least one embodiment of the present disclosure.

FIG. 8 is a chart depicting a method 884 for moving a weight, according to at least one embodiment of the present disclosure. In some embodiments, the method 884 may include securing a weight to a frame attached to a wheel at 886. The weight may be secured to the frame using any known way for securing a weight to an object. For example, the weight may be deer, elk, bear, moose, or other game meat loaded into meat panniers and secured to the frame. In other examples, the weight may be camping equipment secured directly to the frame or loaded into bags and panniers and secured to the frame. In still other examples, the weight may be tools, firewood, rocks, or any other weight that a user may desire to carry with a weight-bearing device.

The weight may be balanced over the wheel at 888. Balancing the weight over the wheel may include lateral balancing, or in other words, evening out the weight on different sides of the wheel on the frame. Balancing the weight may further include balancing the weight with respect to a center of gravity of the weight and the frame. The weight may be balanced such that a gravitational axis (i.e., an axis that is parallel to the force of gravity) that runs through a hub of a wheel is perpendicular or approximately perpendicular to a weight-bearing surface of the frame. By balancing the load or the weight with respect to the center of gravity of the load and the frame, the user allows the wheel to support a majority of the weight, only maintaining the weight using the handles.

The method 884 may further include engaging a motor to rotate a first gear at 890. In some embodiments, engaging the motor may include engaging an electric motor powered by an electric battery pack. In some embodiments, engaging the motor may include engaging the motor with a twist throttle, as described above in relation to FIG. 2-1. The first gear may be directly connected to a second gear using a chain. Thus, the method 884 may further include rotating a second gear at 892. In some embodiments, the second gear and the first gear may have a gear ratio of greater than 8:1, as described above in relation to FIG. 2-1.

The method 884 may further include rotating a wheel at 894. The wheel may be connected to the second gear with a unidirectional torque transfer device such that the wheel rotates at the same rotational rate as the wheel. In some embodiments, the rotational rate may be in a range having an upper value, a lower value, or upper and lower values including any of 1 rotation per minute (RPM), 2 RPM, 4 RPM, 6 RPM, 8 RPM, 10 RPM, 12 RPM, 14 RPM, 16 RPM, 18 RPM, 20 RPM, or any value therebetween. For example, the rotational rate may be less than 20 RPM. In yet other examples, the rotational rate may be less than 16 RPM. For a 27.5 inch outer diameter tire on a wheel, a rotational rate of 16.8 RPM would correlate to a walking speed of approximately 3 miles per hour. When climbing an incline, a user's walking speed, and therefore the rotational rate, would decrease, and when descending a decline, a user's walking speed, and therefore the rotational rate, would increase.

The method 884 may further include resisting the rotation of the wheel using a brake (such as the brake 236 described in relation to FIG. 2-2). Resisting the rotation of the wheel using a brake may be especially effective to slow a weight-bearing device when traveling down a decline.

The method 884 may further include holding the frame with a pair of climbing handles (such as the climbing handles 782 of FIG. 7), the climbing handles being perpendicular to the handles, and perpendicular to a path of travel of the weight-bearing device. As discussed above, holding, or gripping, the climbing handles may help make walking with the weight-bearing device more ergonomically favorable, especially when the handles and climbing handles are in an elevated position. Holding the climbing handles may include twisting a throttle located on the climbing handles.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A weight-bearing device comprising:
   a single wheel configured to contact the ground;
   a motor having a power source and an output shaft;
   a first gear rotationally fixed to the output shaft;
   a second gear connected to the single wheel with a unidirectional torque transfer device, the second gear and the first gear having a gear ratio greater than 6 to 1;
   a chain between the first gear and the second gear;
   a frame including a weight-bearing surface tangential to the single wheel, the frame connected to the single wheel;
   a pair of handles connected to the frame, the pair of handles including:
      a first climbing handle connected to a first terminal end of the pair of handles and oriented approximately perpendicular to one of the pair of handles; and
      a second climbing handle connected to a second terminal end of the pair of handles and oriented approximately perpendicular to another of the pair of handles; and
   a twist throttle configured to control the motor.

2. The device of claim 1, wherein the motor is an electric direct drive motor.

3. The device of claim 1, wherein the twist throttle is a twist throttle connected to a first handle of the pair of handles.

4. The device of claim 1, further comprising a brake.

5. The device of claim 1, wherein the frame is configured to have at least 270° of rotational freedom when the single wheel is in contact with the ground.

6. A weight-bearing device comprising:
   a single wheel having a hub radially centered in the single wheel, the hub having a hub first end and a hub second end;
   a frame having a frame first side and a frame second side, wherein the frame first side is connected to the hub first end and the frame second side is connected to the hub second end, the frame being rotatable relative to the single wheel and including a weight-bearing surface tangential to the single wheel;
   a handle assembly, including:
      a handle support connected to the frame;
      a first handle attached to the handle support, the first handle having a first terminal end;
      a second handle attached to the handle support, the second handle having a second terminal end, wherein the first terminal end is separated from the second terminal end with a gap;
      a first climbing handle connected to the first terminal end and oriented approximately perpendicular to the first handle; and
      a second climbing handle connected to the second terminal end and oriented approximately perpendicular to the second handle;
   an electric motor mounted to the frame;
   a first gear configured to be rotated by the electric motor, the first gear having a first tooth count;
   a second gear connected to the first gear by a chain, the second gear connected to the single wheel with a unidirectional torque transfer device, the second gear having a second tooth count, wherein the second tooth count is at least 8 times greater than the first tooth count; and
   a twist throttle configured to control the motor.

7. The device of claim 6, further comprising a stiff support between the frame first side and the frame second side, the stiff support having a clearance of between 1 millimeters and 12 millimeters from an outer surface of the single wheel.

8. The device of claim 7, wherein a location of the stiff support is adjustable.

9. The device of claim 6, wherein the second tooth count is 81.

10. The device of claim 6, wherein the electric motor is slidingly mounted to the frame.

11. The device of claim 6, wherein a gear distance between the first gear and the second gear is adjustable.

12. The device of claim 6, wherein the frame first side and the frame second side each include two support members connected at the hub with an angle of less than 90°, the frame first side and the frame second side connected by the weight-bearing surface radially past an outer surface of the single wheel, the handle support including a first handle support member and a second handle support member, the first handle being connected to the first handle support member and the second handle being connected to the second handle support member, the first handle support member and the second handle support member being connected to the weight-bearing surface.

13. The weight-bearing device of claim 6, wherein the first climbing handle is permanently attached to the first handle and the second climbing handle is permanently attached to the second handle.

14. The weight-bearing device of claim 6, wherein the first climbing handle is separately formed from the first handle and the second climbing handle is separately formed from the second handle.

15. The device of claim 6, wherein the twist throttle is a twist throttle connected to the first handle.

16. A weight-bearing device comprising:
   a single wheel configured to contact the ground;
   a motor having a power source and an output shaft;
   a first gear rotationally fixed to the output shaft;
   a second gear connected to the single wheel with a unidirectional torque transfer device, the second gear and the first gear having a gear ratio greater than 6 to 1;
   a chain between the first gear and the second gear;
   a frame including a weight-bearing surface tangential to the single wheel, the frame connected to the single wheel;
   a cleaning support connected to the frame proximate the wheel, the cleaning support having a clearance of between 1 millimeter and 12 millimeters from an outer surface of the single wheel to clean debris from the wheel;

a pair of handles connected to the frame, the pair of handles including:
- a first climbing handle connected to a first terminal end of the pair of handles and oriented approximately perpendicular to one of the pair of handles; and
- a second climbing handle connected to a second terminal end of the pair of handles and oriented approximately perpendicular to another of the pair of handles; and a twist throttle configured to control the motor.

17. The weight-bearing device of claim 1, wherein the first climbing handle is permanently attached to the first terminal end and the second climbing handle is permanently attached to the second terminal end.

18. The weight-bearing device of claim 16, wherein the first climbing handle is permanently attached to the first terminal end and the second climbing handle is permanently attached to the second terminal end.

19. The device of claim 16, wherein the twist throttle is a twist throttle connected to a first handle of the pair of handles.

20. The weight-bearing device of claim 16, wherein the cleaning support includes a wire strung across the frame.

21. The weight-bearing device of claim 16, wherein the cleaning support includes a plurality of cleaning supports connected to different support locations on the frame, wherein the cleaning support of the plurality of cleaning supports when positioned in a lower support location has the clearance.

* * * * *